United States Patent [19]
Vandenberg

[11] 3,890,252
[45] June 17, 1975

[54] SHAPED ARTICLES OF CRYSTALLINE COPOLYMERS OF CIS-1,4-DIHALO-2,3-EPOXYBUTANE

[75] Inventor: Edwin J. Vandenberg, Wilmington, Del.

[73] Assignee: Hercules Incorporated, Wilmington, Del.

[22] Filed: Mar. 18, 1974

[21] Appl. No.: 452,487

Related U.S. Application Data

[63] Continuation-in-part of Ser. No. 314,287, Dec. 12, 1972, abandoned.

[52] U.S. Cl............ 260/2 A; 260/2 BP; 260/2 XA
[51] Int. Cl............................................ C08g 23/02
[58] Field of Search............... 260/2 A, 2 BP, 2 XA

[56] References Cited
UNITED STATES PATENTS 3,065,188  11/1962  Vandenberg........................... 260/2
3,251,852  5/1966  DeGroote et al. ............... 260/309.6
3,341,475  9/1967  Vandenberg............................ 260/2

Primary Examiner—Morris Liebman
Assistant Examiner—E. A. Nielsen
Attorney, Agent, or Firm—Hazel L. Deming

[57] ABSTRACT

Shaped articles of high molecular weight crystalline copolymers of cis-1,4-dihalo-2,3-epoxybutane and a small amount of at least one other monomer which is a halogen-substituted alkylene oxide or oxetane containing at least 4 carbon atoms, and particularly of copolymers of cis-1,4-dichloro-2,3-epoxybutane with from 0.5 to 5 weight percent of trans-1,4-dichloro-2,3-epoxybutane, are described.

7 Claims, No Drawings

SHAPED ARTICLES OF CRYSTALLINE COPOLYMERS OF CIS-1,4-DIHALO-2,3-EPOXYBUTANE

This application is a continuation-in-part of my application U.S. Ser. No. 314,287, filed Dec. 12, 1972, and now abandoned.

This invention relates to shaped articles of crystalline polymeric epoxides and more particularly to shaped articles of high molecular weight crystalline copolymers of a cis-1,4-dihalo-2,3-epoxybutane with a small amount of at least one different halogen substituted epoxide or oxetane containing at least 4 carbon atoms.

Crystalline homopolymers of cis-1,4-dihalo-2,3-epoxybutanes are known and described in U.S. Pat. No. 3,065,188. The homopolymers are racemic diisotactic polymers with dd—dd and ll—ll carbon sequences and find use in both plastic and wax applications. The high molecular weight homopolymers can be fabricated into films, fibers and molded articles, particularly where solvent resistance and flame resistance are desired. The homopolymers, however, crystallize so readily from the melt, especially during drawing to make oriented fiber or film, that optimum strength properties cannot be realized.

Now, in accordance with this invention it has been found that the rate of crystallization of polymers of cis-1,4-dihalo-2,3-epoxybutane can be lowered without significant detriment to the other desirable properties of the polymers by including a small amount of certain halogen-substituted alkylene oxides or oxetanes in the polymer and that the copolymers so produced are more readily oriented and give fibers and film of superior properties. Additionally, the products from these copolymers have greater utility, especially as flame-resistant oriented fibers, films, bottles and other shaped articles.

Accordingly, the present invention relates to a shaped article of a high molecular weight, crystalline copolymer of a cis-1,4-dihalo-2,3-epoxybutane and from about 0.5 to about 5 weight %, preferably from about 1 to about 5 weight %, of at least one other monomer which is a halogen-substituted alkylene oxide or oxetane containing at least 4 carbon atoms.

Any cis-1,4-dihalo-2,3-epoxybutane wherein both halogens are the same can be copolymerized with a different halogen-substituted alkylene oxide or a halogen-substituted oxetane to produce the new crystalline copolymers of this invention. Thus, cis-1,4-difluoro-, dichloro-, dibromo- or diiodo-2,3-epoxybutanes can be copolymerized to yield crystalline copolymers.

The other monomers which are polymerizable with the cis-1,4-dihalo-2,3-epoxybutane in small amounts to give the copolymers of the invention are, as stated, any different halogen-substituted alkylene oxide containing at least 4 carbon atoms or a halogen-substituted oxetane containing at least 4 carbon atoms. Monomers of this type include such halogen-substituted alkylene oxides as 2-methyl-3-chloro-1,2-epoxypropane, 1,2-dichloro-3,4-epoxybutane, 2-methyl-3-bromo-1,2-epoxypropane, 1,2-dibromo-3,4-epoxybutane, 1,2-difluoro-2,3-epoxybutane, 1-chloro-3,4-epoxybutane, 1-chloro-4,5-epoxypentane, 1-bromo-3,4-epoxybutane, 1-fluoro-3,4-epoxybutane, 1-bromo-4,5-epoxypentane, 1,1,1-trichloro-3,4-epoxybutane, 1,1,1-trifluoro-3,4-epoxybutane, 1,1,1-tribromo-3,4-epoxybutane, trans-1,4-dibromo-2,3-epoxybutane, trans-1,4-dichloro-2,3-epoxybutane, trans-1,4-difluoro-2,3-epoxybutane, cis- and trans-1,1,4,4-tetrachloro-2,3-epoxybutane, cis- and trans-1,1,4,4-tetrabromo-2,3-epoxybutane, cis- and trans-1,1,4,4-tetrafluoro-2,3-epoxybutane, cis- and trans-1,1,1,4,4,4-hexachloro-2,3-epoxybutane, cis- and trans-1,1,1-trichloro-4,4,4-tribromo-2,3-epoxybutane, perfluoro-2,3-epoxybutane, perfluoro-1,2-epoxybutane and the like, as well as a different cis-1,4-dihalo-2,3-epoxybutane. The halogen-substituted oxetanes are preferably haloalkyl and haloalkoxy oxetane such as 2-chloromethyl oxetane, 2-β-bromoethyl oxetane, 2-fluoromethyl oxetane, 2-trifluoromethyl oxetane, 2-γ-iodopropyl oxetane, 2-β-chlorobutyl oxetane, 2-fluoromethoxy oxetane, 2-chloromethoxy oxetane, 2-bromomethoxy oxetane, 2-iodomethoxy oxetane, 2-β-chloroethoxy oxetane, 2-β-bromobutoxy oxetane, 2-β-fluorooctoxy oxetane, 2-fluoromethoxy methyl oxetane, 2-β-chloroethoxy methoxy oxetane, 2-γ-bromoisopropoxy methyl oxetane, 2-γ-iodobutoxy methyl oxetane, 2-γ-fluorohexoxy methyl oxetane, 2-ω-chlorodecoxy methyl oxetane, 3-chloromethyl oxetane, 3-β-bromoethyl oxetane, 3-β-iodomethyl oxetane, 3-trifluoromethyl oxetane, 3-β-iodopropyl oxetane, 3-β-chlorobutyl oxetane, 3,3-bis(chloromethyl) oxetane, 3,3-bis(fluoromethyl) oxetane, 3,3-bis(iodomethyl) oxetane, 3,3-bis(bromomethyl) oxetane, 3-fluoromethoxy oxetane, 3-chloromethoxy oxetane, 3-bromomethoxy oxetane, 3-iodomethoxy oxetane, 3-β-chloroethoxy oxetane, 3-ω-bromobutoxy oxetane, 3-β-fluorooctoxy oxetane, 3-fluoromethoxy methyl oxetane, 3-β-chloroethoxy methyl oxetane, 3-β-bromoisopropoxy methyl oxetane, 3-ω-iodobutoxy oxetane, 3-ω-fluorohexoxymethyl oxetane, 3-ω-chlorodecoxy methyl oxetane, and the like.

The copolymers of this invention contain from about 99.5 to about 95% of a cis-1,4-dihalo-2,3-epoxybutane and from about 0.5 to about 5% of at least one different halogen-substituted monomer which is an alkylene oxide or an oxetane containing at least 4 carbon atoms. Preferably, the copolymer contains from about 1 to about 5% of other monomer(s).

The copolymers of this invention are characterized as being generally hard, tough, high melting, partially crystalline solids. These copolymers are of the random or block type and are further characterized by having an x-ray pattern similar or related to that of the racemic diisotactic parent homopolymer and by having melting points of at least about 150°C. and preferably at least about 180°C. The copolymers are generally insoluble in water, aliphatic hydrocarbons, aromatic hydrocarbons and chlorinated solvents but generally soluble in cyclohexanone and dimethyl formamide at or above about 50°C. The preferred copolymers are substantially linear polyethers which have a Reduced Specific Viscosity (RSV) of at least about 0.4 and more preferably of at least about 0.5 when measured as a 0.1% or 0.2% solution in dimethyl formamide at 50°C. The copolymers are partially crystalline in an unoriented state, exhibiting a crystallinity of at least about 5% and preferably at least 10% as determined by differential scanning calorimetry.

The high molecular weight crystalline copolymers of this invention are useful for preparing a wide variety of improved plastic articles, films, fibers and foams by compression molding, injection molding, extrusion, vacuum forming, blow molding and the like, with or without subsequent orientation by drawing. A particular advantage of these partially crystalline copolymers over the homopolymers of cis-1,4-dihalo-2,3-epoxybutanes is realized in the preparation of fibers, monofilaments and oriented films since the copolymers can be drawn more readily to induce the orientation contibuting to increased strength. This property advantage is probably a result of the somewhat lower crystallinity, but more importantly due to the lower rate of crystallization before or during the orientation process. These copolymers are also particularly useful in the aforementioned applications because of their flame-retardant properties. The copolymers can be used as such as additives for plastics, elastomers, waxes, coating materials, etc., to decrease inflammability and improve solvent resistance or can be formed into a desirable shape such as, for example, fibers, and blended with other fibers to achieve the property advantages. The copolymers can also be crosslinked with diamines, alone or in combination with other similarly vulcanizable polymers such as polyepichlorohydrin, polychloroprene, etc. Shaped articles of the crosslinked compositions have improved high temperature properties and better solvent resistance than articles of compositions which have not been cross-linked. The copolymers can be advantageously filled with particulate fillers such as silica, alumina, clay, etc., and/or fibrous fillers such as glass fibers, graphite fibers, high melting organic fibers such as fibers of aromatic polyamides, microfibers of alumina, silicon carbide, metal titanates, etc. The filled copolymers are especially useful for molded articles. The copolymers can also be used to form composite structures with other materials such as glass cloth, synthetic fabrics such as the high melting fibrous cloths from aromatic polyamides, etc.

The copolymers of this invention can be prepared by contacting a mixture of the cis-1,4-dihalo-2,3-epoxybutane and the other epoxide or oxetane monomer or monomers with an aluminum alkyl as catalyst. Any aluminum alkyl can be used as, for example, a trialkylaluminum, a dialkylaluminum halide, a dialkylaluminum hydride, an alkylaluminum dihydride, etc. The alkylaluminum compound can be used as such or it can be complexed with water within specified molar ranges. When water is used, the amount will usually be within the range of 0.5 to 1 mole of water per mole of alkylaluminum compound but a ratio of from about 0.1:1 to about 2:1 can be used. The alkyl group of the alkylaluminum compound can be any alkyl as, for example, methyl, ethyl, isopropyl, butyl, isobutyl, hexyl, octyl, etc.

The copolymerization reaction can be carried out in bulk but generally is carried out in a solution or suspension in an inert organic diluent or combination of diluents which are liquids at reaction temperature and have appreciable dissolving power for the cis-1,4-dihalo-2,3-epoxybutane at reaction temperature. Exemplary of diluents that can be used are the halogenated hydrocarbons such as methylene chloride, 1,1-dichloroethane, tetrafluoromethane, trifluoromethane, dichlorofluoromethane, chlorodifluoromethane, 1,1-difluoroethane, 1,1-difluoro-1-chloroethane, chlorobenzene, etc., or a hydrocarbon diluent such as n-heptane, cyclohexane, etc., or combinations of such diluents.

The polymerization reaction can be carried out at any desired temperature and pressure. Usually, atmospheric or autogeneous pressure will be used and a temperature of from about −150°C. to about 0°C. and preferably from about −100°C. to about −30°C. Preferably the temperature is −80°C. to −70°C. and the preferred catalyst is triisobutyl aluminum which has been reacted with about 0.7 mole of water per mole of aluminum in an aliphatic hydrocarbon diluent.

The copolymers of this invention can be formed into shaped articles using conventional molding or extrusion techniques. Thus, as mentioned above, the copolymers can be melt extruded or cast into self-supporting films, spun into fibers or filaments or molded into any desired shape by injection molding, compression molding, blow molding, vacuum forming and the like. Fibers can be spun from the melt or from a dispersion or solution of the copolymer in a suitable diluent. One useful spinning process is to charge the copolymer to a screw extruder fitted with a suitable spinhead and to pass the extruded filaments to take-up equipment or preferably to subject the extruded filaments to standard stretching procedures for orienting a fiber. The extrusion temperature can be as low as 230°C. but is usually within the range of about 240°C. to about 280°C. Stretching or orientation is carried out at elevated temperature, generally at a temperature within the range of from about 100°C. to about 180°C. The degree of stretching will, as is well recognized by those skilled in the art, depend upon such interrelated factors as RSV of the copolymer, drawing temperature, size of the as-spun fiber, amount of draw-down during spinning, the final denier of the fiber desired and the physical properties desired in the final fiber, i.e., tenacity, modulus, elongation and resilience. In general, the filament will be drawn from about 50% to about 600%.

Fibers can also be prepared by spinning a solution or dispersion of the copolymer in a suitable diluent using a spin pump fitted with a suitable spinhead and passing the extruded filaments through a solvent-type (heated) chimney to remove the diluent from the fiber. Spinning operations of this type are usually carried out at a temperature of from about 20°C. to about 150°C. Any inert liquid organic diluent which is at least a partial solvent for the copolymer under spinning conditions can be used. Preferably, the diluent will have a boiling point within the range of from about 30°C. to about 180°C. Particularly suitable diluents include dimethylformamide, dimethylacetamide, cyclohexanone, etc. The amount of diluent used is of course a matter of choice and usually will be an amount to give a copolymer concentration of about 10% to about 90%. If desired, the copolymerization process can be carried out in a suitable diluent such as 1,1-dichloroethane and the spinning operation carried out without the intermediate step of isolating the copolymer. Wet spinning techniques wherein the fiber is spun into a coagulating medium conventionally are also suitable. Obviously, fiber-treatments such as sizing, pigment coloring, dyeing, etc., can also be carried out in any desired order before or after the extrusion of the filament.

Likewise, film can be formed from the melt or from a dispersion or solution of the copolymer in a suitable diluent. For example, film can be formed by applying a solution or dispersion of the copolymer in one of the above diluents, as, for example, dimethylformamide or cyclohexanone, to a hard substrate such as glass, metal, etc., evaporating the diluent and then stripping the film from the substrate. Films can also be formed without the use of a diluent by spreading the molten copolymer on a hard surface and, after cooling, stripping off the film, or by extruding the molten copolymer directly as a flat sheet onto a casting drum or by extruding into a tube, blowing, cutting and flattening or by calendering. Another method of forming films which can be applied to these copolymers is to pass the copolymer through a pair of rolls, one of which is at a temperature above the softening temperature of the copolymer and the other is cold, and then cutting the sheet so formed from the cold roll. Any of the other well-known methods of forming films by casting, molding, etc., can be used in the formation of films from the copolymers of cis-1,4-dihalo-2,3-epoxybutanes.

The films can be used as formed or they can be oriented by stretching, calendering, etc. Oftentimes orientation is inherent in the method by which the film is formed. For example, when extruded directly as a flat film sheet and then calendered, calendering will bring about orientation. Similarly, if the copolymer is extruded into a tube and then blown, the latter action will bring about orientation of the film. If the film is formed by casting, orientation can readily be obtained by elongation of the film, uniaxial or biaxial orientation being obtained as desired by stretching the film in one direction or in two directions substantially perpendicular to one another, respectively. Obviously, conventional film treatment techniques can be applied in any desired order and the film can be colored, filled, etc., by the incorporation of additives in the copolymer melt or solution or dispersion prior to film formation. Aftertreatments such as coating, dyeing, corona treatment, etc., can also be carried out conventionally. If desired, film which has been uniaxially oriented can also be readily split mechanically to give strong fiber-like products.

As stated above, the copolymers of cis-1,4-dihalo-2,3-epoxybutanes are particularly useful when processed into oriented fibers and films since they can be stretched or drawn readily to induce the orientation, contributing increased strength. This drawing property provides outstanding processing advantages over the homopolymers of cis-1,4-dichloro-2,3-epoxybutanes as well as such improved product advantages as higher tensile strength, higher impact resistance, and increased resistance to elevated temperatures.

The following examples illustrate the preparation of the copolymers of this invention and the formation of the copolymers into plastic articles. All parts and percentages are by weight unless otherwise indicated. The molecular weight of the copolymers is shown by their Reduced Specific Viscosity (RSV). By the term "Reduced Specific Viscosity" is meant the $\eta sp/c$ determined on a 0.1% or 0.2% solution of the polymer in dimethylformamide at 50°C., essentially equivalent results being obtained at either dilution. The melting point of the copolymer is determined by differential thermal analysis (DTA) or by differential scanning calorimetry (DSC) and is the temperature at which the last crystallinity disappears. The percent crystallinity was also determined by differential scanning calorimetry (DSC), using a Perkin-Elmer Differential Scanning Calorimeter (Model 1 B). With this instrument the heat of fusion per unit weight on melting the polymer sample, $\Delta H_f$, cal./g., is measured. Then, knowing the heat of fusion for 100% crystalline polymer, $\Delta H_f^o$, cal./g., the % crystallinity of the sample is $$\frac{\Delta H_f}{\Delta H_f^o} \times 100.$$

The crystallinity of the copolymers of this invention is due solely to the cis-1,4-dihalo-2,3-epoxybutane units present in the copolymer. The $\Delta H_f^o$'s were determined for crystalline homopolymer by Flory's indirect method [P. J. Flory, J. Chem. Physics, 10, 51 (1942)] from measurements of melting point, $T_m$, as a function of diluent volume fraction, $\phi$, for a given polymer-diluent pair, using the relationship derived by Flory:

$$\frac{1/T_m - 1/T_m^o}{\phi} = \frac{R}{\Delta H_u} \frac{V_u}{V_l} \left(1 - \frac{BV_l\phi}{RT_m}\right)$$

where $T_m^o$ and $T_m$ are the melting temperatures of the pure polymer and the polymer-diluent mixtures; $\Delta H_u$ is the enthalpy of fusion per repeating unit of 100% crystalline polymer; R is the gas constant; $V_u/V_l$ is the ratio of molar volumes of the polymer repeating unit and the diluent; and B is a diluent-polymer interaction constant. By plotting $(1/T_m - 1/T_m^o)\phi$ versus $\phi/t_m$, a straight line is obtained with an intercept at $(\phi/T_m) =$ O of $RV_u/H_uV_l$. The value of $\Delta H_u$ is obtained immediately since $V_u$ and $V_l$ are known from density and molecular weight data. The $\Delta H_f^o$, cal./g., can be calculated from $\Delta H_u$ and the molecular weight of the polymer repeating unit. The $\Delta H_f^o$ for crystalline poly(cis-1,4-dichloro-2,3-epoxybutane) was determined to be 30.4 cal./g.

Crystallization half-time is also determined by differential scanning calorimetry. In this determination, the polymer is heated to 260°C., the temperature maintained thereat for 3 minutes, and then reduced rapidly to 160°C. in 1 minute, and the time to the crystallization peak measured.

EXAMPLE 1

A polymerization vessel from which the air had been removed and replaced with nitrogen was charged with 13,000 parts of dry methylene chloride and 1100.0 parts of a 99:1 mixture of cis-1,4-dichloro-2,3-epoxybutane and trans-1,4-dichloro-2,3-epoxybutane. The temperature of the charge was reduced using dry ice in the surrounding bath. When the temperature was below −20°C., 1305 parts of dry ethyl chloride was added. The temperature of the reactor contents was further reduced by lowering the bath temperature and, when the temperature reached −78°C., 21.3 parts of catalyst was added. After 1.25 hours and 2 hours of reaction time, respectively, additional portions of 10.6 parts of catalyst were added, the reaction temperature being maintained at −76°C. to −78°C. The catalyst used in this example was a 4.4M solution of triisobutylaluminum which had been reacted with 0.67 mole of water per mole of aluminum. The catalyst was prepared by diluting commercial triisobutylaluminum with n-heptane to a 0.5M concentration, adding 0.67 mole of water per mole of aluminum dropwise with agitation over a period of 3.5 hours at 0°C., permitting the temperature to rise over 4 hours to 25°C., letting the mixture stand at 25°C. for at least 24 hours and then vacuum distilling off sufficient heptane at 50°C. to give a catalyst concentration of 4.4M with respect to aluminum.

After five hours of polymerization time, the mixture in the polymerization vessel became very viscous and stirring was difficult, the temperature gradually rising to −71°C. The reaction was terminated by adding 215 parts of 2N aqueous hydrogen chloride in ethanol, following which the mixture was stirred for 1 hour and then permitted to warm to near room temperature overnight. The copolymer mixture was next washed three times by stirring with three liters of 10% aqueous hydrogen chloride for 6 hours and removing the water layer, and then finally washed with water until neutral. The copolymer slurry was mixed with an equal volume of methanol and the insoluble polymer was collected by filtration and washed once with methanol. The product was then slurried with methanol containing 0.5% of Irganox 1010 Pentaerythritol tetrester of 3-(3,5-di-tert-butyl-4-hydroxyphenyl)propionic acid) and 2.0% ERL 2774 (diglycidyl ether of bisphenol A) based on the product, air dried and then further dried under vacuum for 16 hours at 100°C. The product was 1014 parts (90% conversion) of a crystalline copolymer of cis-1,4-dichloro-2,3-epoxybutane containing 1.0% of trans-1,4-dichloro-2,3-epoxybutane and having an RSV of 0.62 and a melting point of 230°C. By DSC it was found to have a heat of fusion of 9.7 cal./g. and a crystallinity of 32%. Crystallization half-time was 0.92 minute.

A control polymer of cis homopolymer of the same RSV was made by the above procedure except that the monomer charge was pure cis-1,4-dichloro-2,3-epoxybutane. Crystallization half-time was 0.5 minute.

Both the copolymer of this example and the control polymer were melt spun at 270°C. using a 35 hole spinneret with 16 mil diameter holes to give as spun yarns of 24 denier per filament. The fiber from the control polymer was crystallized, brittle, and very difficult to handle and wind on the take-up package. The control sample was judged unsatisfactory for commercial fiber spinning. On the other hand, the copolymer of this example was less crystalline, more flexible and could be wound on the take-up package satisfactorily. The spun yarns were subsequently drawn over a heated pin at 130°C. The control sample could be drawn no higher than 2X and gave tenacities of less than 1.5. The copolymer of this example could be drawn up to 4X and gave yarns with higher strengths than those obtained with the control sample.

EXAMPLE 2

The procedure of Example 1 was repeated except that the monomer charge was a mixture consisting of 97.5% cis-1,4-dichloro-2,3-epoxybutane and 2.5% trans-1,4-dichloro-2,3-epoxybutane, and 1000 parts of ethyl chloride were used. The product of this example was 983 parts (87% conversion) of a highly crystalline copolymer of cis-1,4-dichloro-2,3-epoxybutane containing 2.5 weight % of trans-1,4-dichloro-2,3-epoxybutane and having an RSV of 0.72 and a melting point of 225°C. By DSC the copolymer was found to have a heat of fusion of 7.9 cal./g. and a crystallinity of 26%. Crystallization half-time was 1.8 minutes.

The copolymer of this example was shaped into various articles and evaluated as follows.

A. The copolymer was spun into multifilaments following the procedure of Example 1. The as-spun yarn was stronger and more flexible than the yarn of Example 1 and was judged excellent for use in commercial spinning operations.

B. Nonoriented film was formed by compression molding the copolymer using a press with polished platens at 250°C. for 3 minutes under 50 p.s.i.g. pressure, the press being cooled with water prior to removal of the film. The film was clear, had a thickness of 5 mils and had a tensile strength of 7500 p.s.i., a tensile modulus of 320,000 p.s.i. and an elongation at break of 2.7%.

C. Uniaxially oriented film of the copolymer was formed according to procedure B above, except that following molding at 250°C. for 3 minutes the pressure was released, and the film was immediately removed from the press and quenched in water at 15°C. The quenched film was placed in a drawing frame, the frame was placed in a 160°C. oven for 1 minute and the film was drawn to 6.7 times its length. The drawn film was clear and strong and had a tensile strength of 30,000 p.s.i., a tensile modulus of 320,000 p.s.i. and an elongation at break of 12%.

D. Biaxially oriented film was formed utilizing procedure C above except that following quenching the film was stretched in two directions by placing a 2¼ inch × 2¼ inch sample of the film in a T.M. Long film stretcher, heating the film to 160°C. for about 15 seconds and then drawing the film lengthwise and crosswise at a rate of about 15 inches per second, the draw ratio being about 3.25. The drawn film was clear and tough and had a tensile strength of 11,000 p.s.i., a tensile modulus of 450,000 p.s.i. and an elongation of 27%.

E. Bars were formed of the copolymer by molding the copolymer in a Minijector, plunger-type injection molding machine having a barrel temperature of 250°–260°C. The bars (0.5 inch square) were clear, hard and tough. Tensile test specimens molded in the same manner exhibited a tensile strength of 9300 p.s.i., a tensile modulus of 550,000 p.s.i. and an elongation of 3.0%.

F. Laminates were formed by alternately stacking nine sheets of the film (4 × 4 inch − 2.3 gram weight) prepared as in B above with 8 pieces of glass cloth (4 × 4 inch − 2.95 gram weight) to give a layered assembly having exterior sheets of film, and then pressing the assembly in an Elmes press at 250°C. for 6 minutes using a 4 inch × 4 inch × 80 mil frame, pressing being carried out at 20 tons pressure during the last 2 minutes of time. The laminate was cooled in the press under pressure, cold water being used to reduce the temperature. The glass cloth was No. 181 Style E cloth surface-treated with an aminosilane. The laminate was very hard and strong, had a thickness of 85 mils and exhibited a flexural strength of 62,000 p.s.i., a flexural modulus of $2 \times 10^6$ p.s.i. and a high speed flexural impact strength of 63 in.-lb.

For comparative purposes a laminate was also formed by the above procedure except that sheets of isotactic polypropylene film were substituted for the sheets of copolymer film, the volume percent of glass being maintained at the same level. The laminate from polypropylene film gave a flexural strength of 34,000 p.s.i., a flexural modulus of $2.0 \times 10^6$ p.s.i. and a high speed impact strength of 43 in.-lb. The above results demonstrate that composite articles formed from the copolymers of this invention are stronger and harder and have greater heat resistance than composite articles formed from polypropylene.

G. Blown bottles were formed by extruding the copolymer at 260°C. through an annular orifice to form

EXAMPLE 3

The general procedure of Example 1 was repeated with the following exceptions. The charge was 1820 parts of a 98:2 mixture of cis-1,4-dichloro-2,3-epoxybutane and trans-1,4-dichloro-2,3-epoxybutane, 21,400 parts of methylene chloride and 1985 parts of ethyl chloride. Initially, 35.3 parts of catalyst were added, followed by 17.6 parts after 10 minutes, 8.8 parts after 25 minutes, and 8.8 parts after 33 minutes. Throughout the run, the reaction temperature was permitted to rise slowly (−75°C. at 30 minutes; −70°C. at 1 hour; and −71°C. at 2 hours) to −67°C. to −68°C. and maintained thereat for the rest of the run. After 5.3 hours of reaction time, the reaction was terminated by adding 353 parts of 2N aqueous hydrogen chloride in ethanol. The product was then washed and isolated as in Example 1 using 5 liters of 10% aqueous hydrogen chloride. The product of this example was 1593 parts (85% conversion) of a crystalline copolymer of cis-1,4-dichloro-2,3-epoxybutane containing 2.0 weight % of trans-1,4-dichloro-2,3-epoxybutane and having an RSV of 0.54 and a melting point of 225°C. By DSC the copolymer was found to have a heat of fusion of 6.7 cal./g. and a crystallinity of 22%. Crystallization half-time was 2.3 minutes.

When the copolymer of this example was spun into multifilaments following the procedure of Example 1, the as-spun yarn was stronger and more flexible than the yarn of Example 1 and was judged excellent for use in commercial spinning operations.

What I claim and desire to protect by Letters Patent is:

1. A shaped article of a high molecular weight, crystalline copolymer of a cis-1,4-dihalo-2,3-epoxybutane and from about 0.5 to about 5 weight % of at least one other monomer which is a halogen-substituted alkylene oxide or oxetane containing at least 4 carbon atoms, said copolymer having a crystallization half-time greater than the homopolymer of said cis-1,4-dihalo-2,3-epoxybutane.

2. The article of claim 1 wherein the copolymer contains from about 1 to about 5 weight % of said other monomer.

3. The article of claim 1 wherein said epoxybutane is cis-1,4-dichloro-2,3-epoxybutane.

4. The article of claim 3 wherein said other monomer is trans-1,4-dichloro-2,3-epoxybutane.

5. The article of claim 4 wherein the copolymer contains from about 1 to about 5 weight % of trans-1,4-dichloro-2,3-epoxybutane.

6. The article of claim 5 shaped into a fiber or film.

7. The article of claim 6 wherein the fiber or film is oriented.

* * * * *